US006612109B2

(12) United States Patent
Mickelson

(10) Patent No.: US 6,612,109 B2
(45) Date of Patent: Sep. 2, 2003

(54) HYDRAULIC POWER BOOST SYSTEM FOR A WORK VEHICLE

(75) Inventor: Roger D. Mickelson, West Burlington, IA (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 10/033,820

(22) Filed: Dec. 20, 2001

(65) Prior Publication Data

US 2003/0115864 A1 Jun. 26, 2003

(51) Int. Cl.[7] .......... F16D 31/02

(52) U.S. Cl. .......... 60/421; 60/429

(58) Field of Search .......... 60/421, 429

(56) References Cited

U.S. PATENT DOCUMENTS

| | | | | |
|---|---|---|---|---|
| 3,146,593 A | * | 9/1964 | Stacey | 60/421 |
| 5,101,627 A | * | 4/1992 | Fujii et al. | 60/429 |
| 5,996,341 A | * | 12/1999 | Tohji | 60/421 |
| 6,430,922 B2 | * | 8/2002 | Tohji | 60/421 |

* cited by examiner

*Primary Examiner*—F. Daniel Lopez
(74) *Attorney, Agent, or Firm*—John William Stader; Rebecca L. Henkel

(57) ABSTRACT

A backhoe hydraulic system includes a first source of hydraulic fluid, a tank or reservoir, a boom lift cylinder, and a directional control valve that controls fluid flow between the boom swing cylinder and the tank and reservoir. The system also includes a second source of hydraulic fluid (at a higher pressure than the first source) that is connected to one port of the boom lift cylinder via a separate boost valve.

5 Claims, 2 Drawing Sheets

HYDRAULIC POWER BOOST SYSTEM FOR A WORK VEHICLE

FIELD OF THE INVENTION

This invention relates generally to work vehicles having implements movable with respect to the vehicle by hydraulic cylinders. More particularly, it relates to dual hydraulic systems for providing additional hydraulic fluid to selected ones of the hydraulic cylinders.

BACKGROUND OF THE INVENTION

Work vehicles, such as tractors, skid-steer loaders, backhoes, road graders, tele-handlers, and other similar vehicles, typically include a vehicle that travels over the ground and one or more implements that are attached to the vehicle and operate by the movement of hydraulic cylinders. The vehicles typically have a hydraulic power supply that provides a source of hydraulic fluid under pressure to the hydraulic cylinders, thereby moving the implements with respect to the vehicle. In addition, they typically have several hydraulic directional control valves that are controlled by the operator to conduct the hydraulic fluid flow to and from the hydraulic cylinders, thereby permitting the operator to control the implements.

Most of these vehicles typically have a single hydraulic power source that provided hydraulic fluid under pressure to all of the hydraulic cylinders. In many such vehicles, the hydraulic valves that are coupled between the hydraulic fluid source and the cylinders themselves are located in a single unitary bank of valves commonly called a "valve manifold". With a common pressure source providing fluid under pressure to each of these valves, the various linkages and hydraulic cylinders must all be designed to handle the pressure provided by the hydraulic fluid source. Thus, for example, if the hydraulic fluid source provides fluid at 900 psi, and is provided to all of the valves, the linkages, hydraulic conduits, and hydraulic cylinders on the implement must all be designed to handle this high pressure.

This is not always practical, however. For example, on most such work vehicles, there are occasions in which one linkage or hydraulic cylinder does not need this great a hydraulic pressure. One example of this is the work vehicle commonly called a "loader backhoe". The backhoe implement or attachment on a loader backhoe is comprised of several jointed arms and a bucket or other work tool located at the far end thereof. It has been found that one of the hydraulic cylinders on the backhoe implement, a cylinder called the "boom lift cylinder", would benefit if it could be connected to a source of hydraulic fluid at a pressure greater than that provided to the other hydraulic cylinders in the vehicle. This is because the boom cylinder is located near the base of the backhoe boom and lifts the entire boom with respect to the vehicle. Given the great overhanging bulk of the backhoe boom, a higher pressure provided to the boom lift cylinder would permit the backhoe arm to be raised and lowered much more easily and rapidly. This higher pressure is not necessary for the other hydraulic cylinders in the backhoe implement since they do not operate under the same loads as the boom lift cylinder.

An early solution to this problem was simply to increase the system pressure of the hydraulic supply and thereby providing hydraulic fluid flows at a much higher pressure to all of the valves and all of the cylinders in the backhoe implement. This solution was not acceptable, since raising the system pressure provided to the valve manifold and the hydraulic cylinders on the implement to which it is couple caused premature wear and failure of many of the structural components that did not need this additional pressure or forces to operate.

A second solution, shown in FIG. 1, was to provide two separate sources of hydraulic fluid under pressure: a first circuit operating at 2000 psi, and a second source of hydraulic fluid under pressure that operated at a higher pressure, such as 3000 psi. The operator was provided with a switch that permitted him to turn the second high-pressure supply on and off.

This arrangement was also unsatisfactory. Even though the operator could engage the second high pressure supply at will, there was still premature wear and damage to the other valves in the manifold, as well as the hydraulic cylinders and structural components in the backhoe implement to which the valves were coupled. All valves and all cylinders experienced the increased pressure, even though the increased pressure was not necessary for their operation even under high load operating conditions. Indeed, it is desirable to provide a higher pressure only to one or two of the hydraulic cylinders that move the implement, and for those implements only use the high-pressure hydraulic fluid occasionally for particular operations that require the additional pressure.

What is needed, therefore, is a system that permits high pressure to be applied only to particular hydraulic cylinders used to move an implement with respect to a work vehicle while applying a lower pressure to other similar cylinders. It would also be beneficial to provide a system in which single hydraulic pressure supply at low pressure could be applied to several hydraulic cylinders in a work vehicle and a second source of hydraulic fluid under pressure could be selectively applied to a subset of those cylinders. It would also be beneficial to provide a system in which a low pressure source of hydraulic fluid could be applied to a valve manifold and the plurality of valves in the manifold and a second higher pressure source of hydraulic fluid could be applied to a subset of those valves in the manifold. It is an object of this invention to provide these advantages.

SUMMARY OF THE INVENTION

In accordance with a first embodiment of the invention, a hydraulic system for operating an implement coupled to a work vehicle is provided, the system including a first hydraulic fluid source configured to generate a flow of hydraulic fluid at a first pressure, a second hydraulic fluid source configured to generate a flow of hydraulic fluid at a second pressure higher than the first pressure, a hydraulic fluid reservoir, a plurality of hydraulic cylinders coupled to the implement to move the implement, and a valve manifold including a plurality of hydraulic valves configured to control the flow of fluid to the plurality of hydraulic cylinders, the manifold defining a pressurized hydraulic fluid supply conduit, a low pressure hydraulic fluid return conduit, and an open center conduit that is closed by actuation of the plurality of hydraulic valves, wherein the first fluid source is coupled to the manifold to provide hydraulic fluid under pressure to each of the plurality of valves and through those valves to each of the plurality of hydraulic cylinders, and wherein the second fluid source is directly coupled to at least one of the plurality of cylinders to supply fluid to the at least one cylinder. The second fluid source may be coupled to the manifold and may be in fluid communication with the open center conduit. The system may include a boost valve disposed to control fluid flow between the second fluid source and the manifold, and to control flow between the second fluid source and the at least one cylinder. The plurality of valves may include at least one operator actuable control valve for controlling flow in both directions to at least one cylinder. The boost valve may be configured to conduct fluid from the second fluid source to the at least one cylinder when at least one valve is opened by the operator. The work vehicle may be a backhoe and at least one cylinder may be a boom lift cylinder.

In accordance with a second embodiment of the invention, a hydraulic system for a backhoe is provided, including a first hydraulic fluid source configured to generate a flow of hydraulic fluid at a first pressure, a second hydraulic fluid source configured to generate a flow of hydraulic fluid at a second pressure higher than the first pressure, a hydraulic fluid reservoir, a boom swing cylinder, a boom lift cylinder, a dipper cylinder, and a bucket cylinder, a valve array including a boom swing cylinder valve, a boom lift cylinder valve, a dipper cylinder valve, and a bucket cylinder valve, in fluid communication with the boom swing cylinder, the boom lift cylinder, the dipper cylinder, and the bucket cylinder, wherein each of the valves in the valve array are in fluid communication with the first fluid source and are disposed to regulate fluid from the first fluid source to their respective cylinders, and wherein the second fluid source is directly coupled to the boom lift cylinder, and a pressure boost valve in fluid communication with the boom lift cylinder and the second fluid source that is configured to provide fluid flow from the second fluid source to the boom lift cylinder when the boom lift cylinder valve is opened. The boom lift cylinder may have an extend port and a retract port configured to extend and retract the boom lift cylinder when fluid is introduced into each respective port. The boom lift cylinder valve may have an extend port and a retract port that are in fluid communication with the extend and retract ports of the boom lift cylinder, and may also have a reservoir port and a supply port that are in fluid communication with the reservoir and the first fluid source, respectively. The second fluid source may be in fluid communication with one of the extend and retract ports of the boom lift cylinder, and with the port of the boom lift cylinder valve that is in fluid communication with the one port.

BRIEF DESCRIPTION OF THE DRAWINGS

The present invention will become more fully understood from the following detailed description, taken in conjunction with the accompanying drawings, wherein like reference numerals refer to like parts, in which.

DETAILED DESCRIPTION OF THE PREFERRED EMBODIMENT

Figure 1:
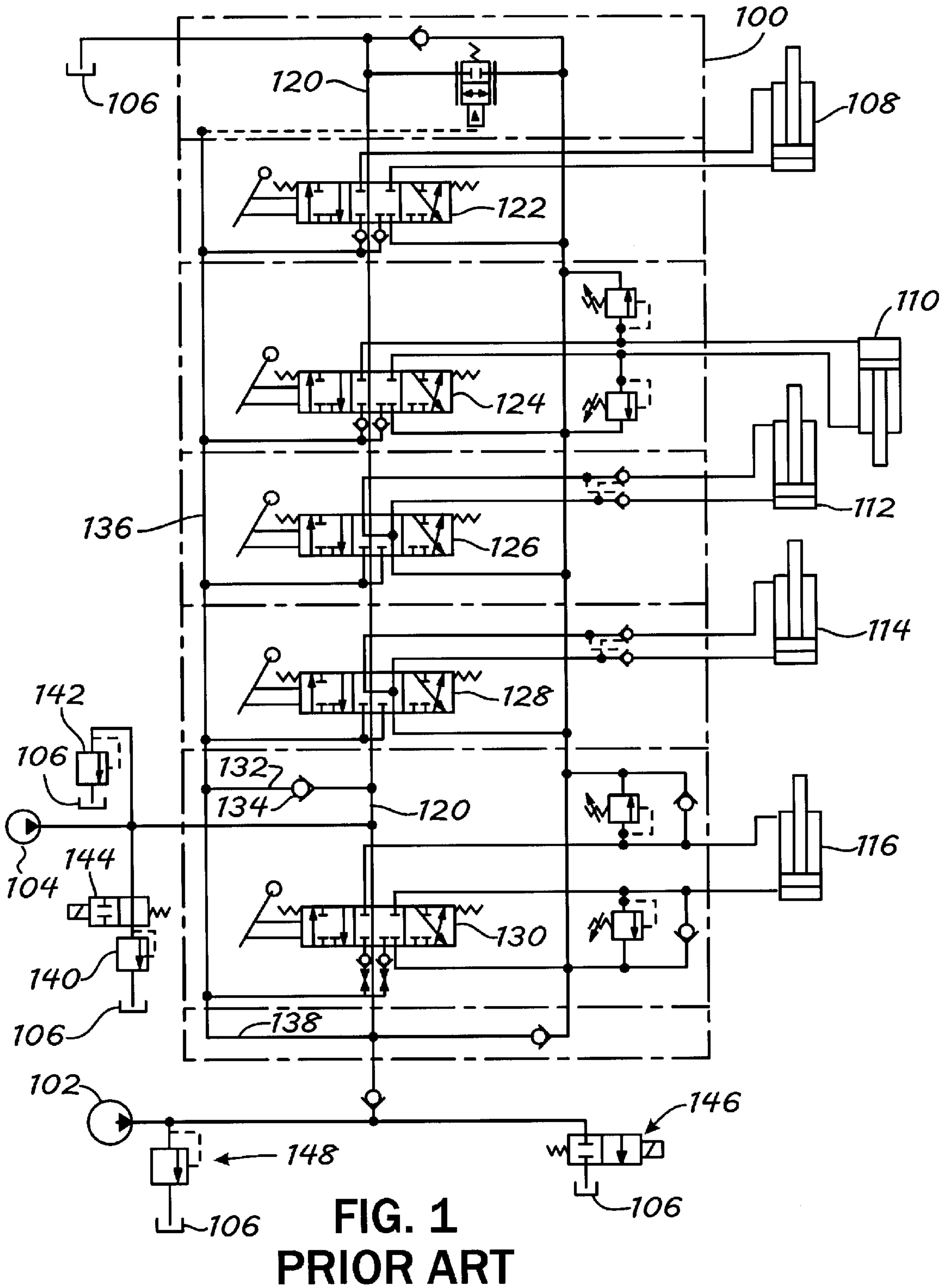
FIG. 1 PRIOR ART
FIG. 1 shows a prior art hydraulic system in which a plurality of hydraulic cylinders located on an implement are driven by a corresponding plurality of valves in a single valve manifold, wherein the valve manifold can be selectively provided with hydraulic fluid from two hydraulic fluid sources, one a primary source and the other a secondary source.

FIG. 1 illustrates a prior art hydraulic system commonly used in work vehicles, such as backhoes, to provide two sources of hydraulic fluid under pressure: one a primary source and the other a secondary source. It includes a unitary valve manifold 100 that is supplied with fluid from both a primary pump source 102 and a secondary pump source 104. Manifold 100 is also coupled to a hydraulic fluid return, reservoir or tank 106. Fluid from the two hydraulic pressure sources is directed into the manifold and is distributed by the valves in the manifold to several dual acting hydraulic cylinders, which are also coupled to the manifold by hydraulic fluid supply and return lines. These hydraulic cylinders include a bucket cylinder 108 configured to move a backhoe bucket with respect to a dipper, a boom lift cylinder 110 configured to lift a backhoe boom with respect to the vehicle, a dipper cylinder 112 configured to raise and lower the dipper with respect to the boom, a stabilizer cylinder 114 configured to raise and lower at least one stabilizer with respect to the vehicle to engage the ground and stabilize the backhoe, and at least one boom swing cylinder 116 which is coupled between the vehicle and the backhoe implement to pivot the backhoe implement side-to-side about a generally vertical axis.

Valve manifold 100 is configured to receive fluid from both of the hydraulic sources 102 and 104, and to send the hydraulic fluid from these sources to any of the cylinders 108–116. In a similar fashion, valve manifold 100 is configured to receive fluid from each of the cylinders 108–116 and to conduct it back to a low-pressure tank or reservoir 106.

As long as all of the valves in the manifold (including bucket valve 122, boom lift valve 124, dipper valve 126, stabilizer valve 128, and boom swing valve 130) are in the neutral center position, (i.e., as shown in FIG. 1) fluid flows freely through open center conduit 120 back to tank 106. Whenever any of these valves in the valve manifold are moved away from their neutral center position, flow back to tank 106 is interrupted and the entire output of the secondary source 104 is diverted into hydraulic line 132, through check valve 134, and into a common high-pressure hydraulic fluid supply line 136. This high-pressure supply line extends through each valve section of valve manifold 100 and applies high-pressure hydraulic fluid to each and every valve in the manifold. Thus, if the secondary source 104 is engaged to provide a source of hydraulic fluid at high pressure, it is applied equally to all of the valves 122–130 in the manifold.

In a similar fashion, the primary source 102 is also coupled to open center conduit 120 to provide it with hydraulic fluid. When any of the valves 122–130 are moved away from their neutral center position, open center conduit 120 is broken and flow back to tank 106 is interrupted. In this case, however, when free flow back to tank 106 is interrupted, fluid from source 102 is directed through hydraulic line 138 and into high-pressure supply line 136. When source 104 is disabled, source 102 provides all fluid flow to the system, and the system is pressurized at the lower pressure of source 102.

Both sources of hydraulic fluid under pressure, the primary source 102 and the secondary source 104, conduct fluid into an open center conduit 120 defined in valve manifold 100. Both sources similarly are diverted into high-pressure supply line 136 whenever the open center conduit is broken by the movement of any of the valves in the valve manifold. If secondary source 104 is turned on or engaged to provide hydraulic fluid to manifold 100, it is applied equally to all of the valves in the manifold and hence also to all of the cylinders that are coupled to the manifold and controlled by the valves in the manifold.

In the system of FIG. 1, the primary pump system 102 is connected to manifold 100 through a check valve. Source 102 is also connected to unloading valve 146. Relief 148 controls pressure for this pump. Secondary pump 104 is also connected to manifold 100. It has a high-pressure relief valve 142 and a two-position solenoid valve 144, which tees this pump to low pressure relief valve 140. Relief valves 140 and 148 are set at the same pressure.

During normal operations, both pumps combine to supply manifold 100 high flow and low pressure. When unloading valve 146 and selector valve 144 are energized, the primary pump flow is dumped to tank while the secondary pump is working against the higher pressure relief 142.

Figure 2:
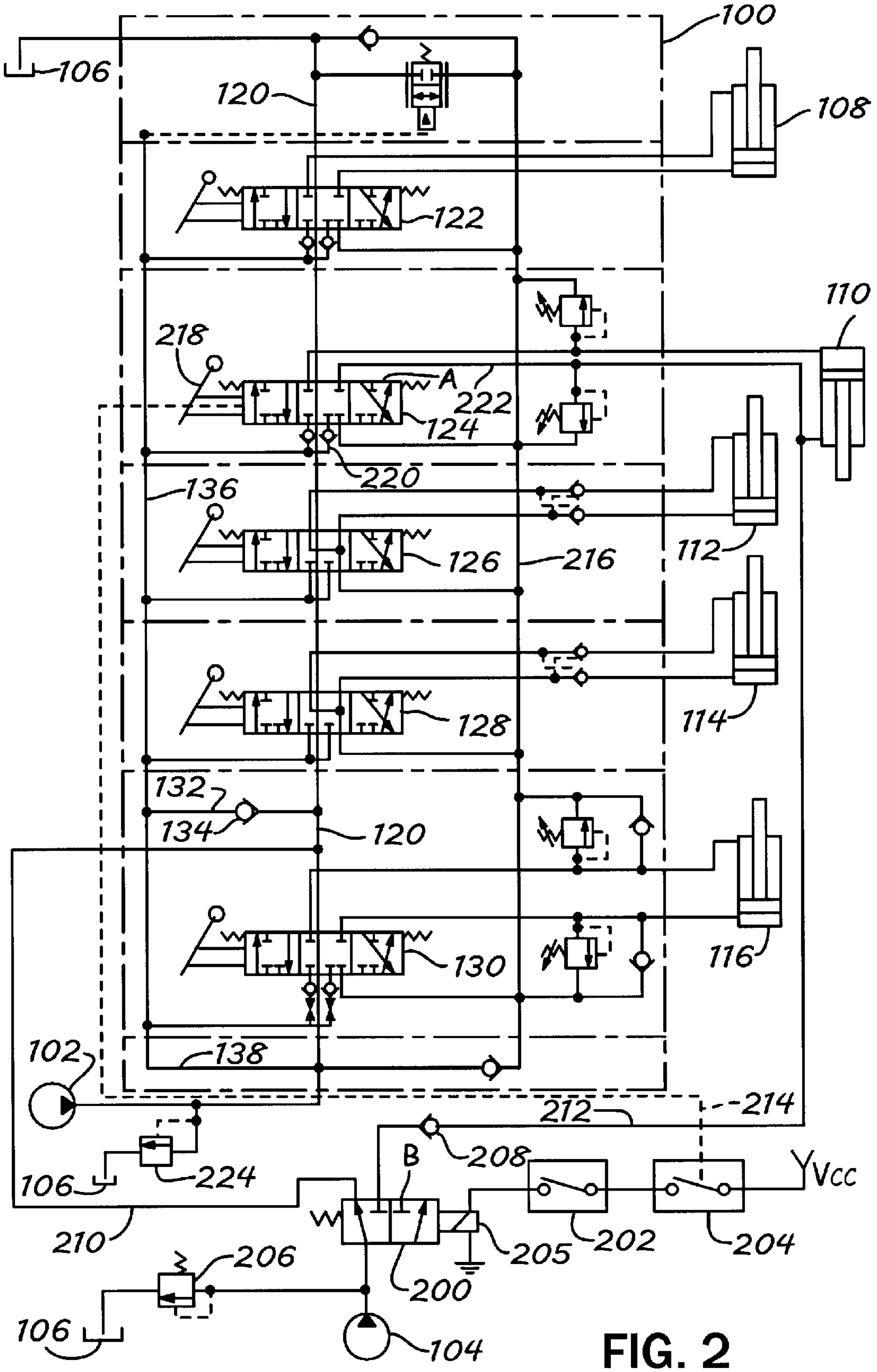
FIG. 2 illustrates a hydraulic system for a work vehicle having an implement that has two sources of hydraulic fluid under pressure, a primary source and a secondary source, wherein both sources can be applied to all the cylinders in the system, and only the secondary source can be provided to one of the hydraulic cylinders in the system.

In FIG. 2, secondary source 104 is coupled both to manifold 100 and directly to boom lift cylinder 110. A boost valve 200 is coupled between secondary source 104 and manifold 100 and boom lift cylinder 110. Two switches, 202 and 204 connected in series control the operation of valve 200 by connecting and disconnecting valve coil 205 of valve 200 to and from a source of electrical power, $V_{cc}$. A pressure regulator valve 206 is coupled between secondary source 104 and tank 106 to dump fluid from source 104 back to tank 106 if pressure exceeds predetermined limits. When the pressure drops below the predetermined limits, valve 206 closes automatically. A check valve 208 is disposed in the hydraulic line extending from boost valve 200 to boom lift cylinder 110 and is configured to prevent the backflow of hydraulic fluid from cylinder 110 to boost valve 200.

Boost valve 200, when de-energized, is in the position shown in FIG. 2. In this default position, hydraulic fluid from secondary source 104 is conducted through hydraulic conduit 210 to open return conduit 120. The path defined by hydraulic conduit 210 and open center return conduit 120 permits hydraulic fluid under pressure provided by secondary source 104 to return to tank 106 with minimal resistance when the control valves are in neutral, thereby reducing the load on secondary source 104 when its fluid is not required to move boom lift cylinder 110.

Boost valve 200 has a second position in which fluid is directed from secondary source 104 through hydraulic conduit 212 to one port (the retract port, in this example) of boom lift cylinder 110.

Switch 202 is preferably located in the operator's station of the work vehicle (e.g. backhoe) where it can be manually actuated by the vehicle operator. Switch 204 is mechanically coupled to valve 124, the hydraulic control valve that controls the flow of fluid to and from boom lift cylinder 110 as indicated by dashed line 214. Whenever boom lift valve 124 is moved to position "A" by the operator manipulating valve actuator 218, switch 204 is closed. When switch 204 is closed, and assuming the operator has also closed master boost switch 202 in the operator station, electrical power from source $V_{cc}$ flows through coil 205 to ground, energizing valve 200 and shifting valve 200 to position B. In position B, boost valve 200 conducts hydraulic fluid from secondary source 104 into hydraulic conduit 212 and into the retract port of the boom lift cylinder 110. Thus, if master switch 202 is turned on, moving valve 124 to position A fills the retract port of cylinder 110 with fluid from source 104.

At the same time, movement of valve 218 to position A closes switch 124, and also couples the extend port of boom lift cylinder 110 to tank 106 thereby permitting fluid from the extend port to escape cylinder 110 through the metering notches of valve 124 at the same time high pressure fluid is entering the retract port of cylinder 110 not through valve 124. Moving boom lift valve 124 to position "A"" also couples primary source 102 to the retract port of boom lift cylinder 110 but the system does not permit fluid from source 102 to enter cylinder 110 when the boost valve is in position "B". If pressure to retract the cylinder is less than relief valve 224, then this hydraulic fluid will combine with fluid from secondary source 104 to move the cylinder at full speed.

When valve 124 is shifted away from its neutral or closed position, it blocks open center conduit 120. This forces fluid from primary source 102 to flow into hydraulic line 138 and into supply line 136. From supply line 136, fluid from primary source 102 is applied to check valve 220.

In position "A", however, with the boost system turned on, fluid from secondary source 104 acts on conduit 222, passes through the spool of valve 124 and acts against load check valve 220. Load check valve 220 is disposed to prevent backflow, however, and therefore is closed by the greater pressure in conduit 222. This prevents the pressure generated by secondary source 104 from passing through valve 124 and check valve 220. This prevents the pressure in supply line 136 from rising above the pressure generated by primary source 102. It is check valve 220 that limits the high pressures generated by secondary source 104 to extend past valve 124.

It should be clear that, with the high pressure from secondary source 104 limited to boom lift cylinder 110, movement of any of the other valves 122, 126, 128, or 130, would only apply fluid from primary source 102 to their respective hydraulic cylinders 108, 112, 114, and 116. Since check valve 220 blocks supply line 136 from secondary source 104, the pressure in supply line 136 is not greater than the pressure generated by primary source 102.

The operator may choose not to use the power boost system by opening switch 202 located in the operator station. In this case, regardless of the position of any of the valves in manifold 100, boost valve 200 will remain in the position shown in FIG. 2, thereby always providing fluid to open center return conduit 120. With switch 202 in this position, and with all the valves and manifold 100 in the position shown in FIG. 2, the output of secondary source 104 will be transmitted through conduit 210 and into open center conduit 120. It will be carried upward through the open center conduit (as shown in FIG. 2) and will empty into reservoir 106.

In the event any of the control valves 122, 124, 126, 128, and 130 are moved away from their neutral position, the open center conduit will be blocked and no flow will be permitted through conduit 120 to tank 106. Since secondary source 104 is connected to open center conduit 120, and since its outlet to tank 106 is blocked, it forces fluid through hydraulic line 132 and check valve 134. The fluid flows into line 136. Rather than developing the high pressure provided by relief valve 206, fluid flow through check valve 134 and line 136 acts against relief valve 224, which is coupled to the hydraulic line extending from primary source 102 to manifold 100. Relief valve 224 is configured to open and to conduct fluid to tank 106 when the pressure rises above the pressure setting of low-pressure source 102. Indeed, it is relief valve 224 that sets the maximum pressure for primary source 102. Thus, even though flow through open center conduit 120 is blocked by an open valve, and even though hydraulic fluid reaches line 136, it will still not generate the high pressure possible from secondary source 104 in line 136.

Thus, the secondary source 104 provides hydraulic fluid under high pressure directly to the retract port of the boom lift hydraulic cylinder 110, and the motion of that cylinder is regulated by controlling the outflow of the fluid from the extend port of the hydraulic cylinder using a directional control valve 124.

Even though low-pressure fluid is also provided to the directional control valve 124, and would (in the absence of a high pressure resistance force provided by source 104) retract the cylinder 110, the presence of the secondary source 104 and the higher fluid pressure it provides at the retract port is sufficient to block all low-pressure fluid flow from the directional control valve 124 to the retract port of boom lift cylinder 110.

In short, while the directional control valve 124 provides a passage for low-pressure fluid flow to the retract port of the cylinder 110, it is blocked by the higher fluid pressure provided by secondary source 104.

Thus, when the selector valve 200 is energized, the secondary source 104 is diverted directly to the lift port of the boom cylinder 122. The cylinder cannot move until the exhaust port of the opposite side of the cylinder is vented back to tank through metering slots of valve 124. During this throttling of valve 124, the supply of hydraulic fluid from primary source 102 is also available to valve 124, but at a much lower pressure, and its flow just continues back to tank with minimal increase in open center pressure drop.

When both the secondary and primary sources 104, 102 are coupled to the circuit, however, the cylinder 110 moves in the retract direction by throttling fluid flow from extend port of the cylinder 110 back to the reservoir 106 in the directional control valve 124 while simultaneously providing fluid flow to the cylinder from both pump sources 104 and 102, through valve 124.

The cylinder 110 moves in the extend direction by disconnecting or disengaging the retract port from secondary source 104 and using the directional control valve 124 to throttle fluid flow from the both pump sources 102 and 104 to the extend port, and using the directional control valve 124 to throttle fluid flow from the retract port to the reservoir 106.

While in this embodiment, the power boost is provided to the retract port, it could as easily be provided to the extend port by coupling the secondary source 104 to the extend port and coupling switch 204 to the directional control valve 124 to close and thereby engage the high-pressure source whenever the operator moves the directional control valve 124 in a direction that throttles a flow of hydraulic fluid from the retract port back to the reservoir 106.

The pressure provided by source 104 is limited and controlled by pressure regulating valve 206 just as the pressure provided by source 102 is limited and controlled by pressure regulating valve 224. Thus, when the pressure provided by source 104 rises above a pre-determined level, valve 206 opens and conducts flow from source 104 to tank 106.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims.

What is claimed is:

1. A hydraulic system for a backhoe, comprising:

a first hydraulic fluid source configured to generate a flow of hydraulic fluid at a first pressure;

a second hydraulic fluid source configured to generate a flow of hydraulic fluid at a second pressure higher than the first pressure;

a hydraulic fluid reservoir;

at least one boom swing cylinder, a boom lift cylinder, a dipper cylinder, and a bucket cylinder;

a valve array including a boom swing cylinder valve, a boom lift cylinder valve, a dipper cylinder valve, and a bucket cylinder valve, in fluid communication with the at least one boom swing cylinder, the boom lift cylinder, the dipper cylinder, and the bucket cylinder, wherein each of the valves in the valve array are in fluid communication with the first fluid source and are disposed to regulate a flow of fluid from the first fluid source to their respective cylinders, and wherein the second fluid source is coupled to the boom lift cylinder while bypassing the remainder of the valves in the valve array, and a pressure boost valve in fluid communication with the boom lift cylinder and the second fluid source and configured to provide fluid flow from the second fluid source to the boom lift cylinder when the boom lift cylinder valve is opened.

2. The hydraulic system of claim 1, wherein the boom lift cylinder has an extend port and a retract port configured to extend and retract the boom lift cylinder when fluid is introduced into each respective port.

3. The hydraulic system of claim 2, wherein the boom lift cylinder valve has an extend port and a retract port that are in fluid communication with the extend and retract ports of the boom lift cylinder, and has a reservoir port and a supply port that are in fluid communication with the reservoir and the first fluid source, respectively.

4. The hydraulic system of claim 3, wherein the second fluid source is in fluid communication with one of the extend and retract ports of the boom lift cylinder and with the port of the boom lift cylinder valve that is in fluid communication with said one port.

5. A method of moving a dual-ported hydraulic cylinder of a work vehicle, wherein the work vehicle includes a first hydraulic source of fluid at a first pressure, a directional control valve coupled to the first source to direct a flow of hydraulic fluid at the first pressure from the first source to both of the dual ports, and a hydraulic reservoir coupled to the directional control valve to receive an exhaust flow of hydraulic fluid from the dual ports and to transmit the exhaust flow to the reservoir, and a second hydraulic source at a second pressure greater than the first pressure that is selectively coupled to one of the dual ports of the hydraulic cylinder, the method comprising the steps of:

communicating hydraulic fluid from the second source to a first port of the hydraulic cylinder while bypassing the other of said dual ports;

regulating the motion of the hydraulic cylinder by throttling the exhaust flow from a second port of the hydraulic cylinder in and through the directional control valve to the reservoir;

disengaging the second source from the first port of the hydraulic cylinder; and regulating the motion of the hydraulic cylinder by simultaneously throttling fluid flow in and through the directional control valve to the first port of the hydraulic cylinder and throttling exhaust flow in and through the directional control valve to the reservoir.

* * * * *